United States Patent

[11] 3,633,070

[72] Inventors Louis J. Vassos
7025 N. Osceola, Chicago, Ill. 60631;
Alex F. Gawron, 7727 West Farragut Ave.,
Chicago, Ill. 60656
[21] Appl. No. 884,888
[22] Filed Dec. 15, 1969
[45] Patented Jan. 4, 1972

[54] GROUND FAULT CURRENT INTERRUPTER
11 Claims, 7 Drawing Figs.
[52] U.S. Cl. .................................................. 317/18 D,
317/27, 317/49
[51] Int. Cl. ........................................................ H02h 3/26
[50] Field of Search ............................................ 317/18 D,
27, 49; 323/6, 44, 88

[56] References Cited
UNITED STATES PATENTS
2,686,291  8/1954  Macklem ........................ 323/88
3,213,321  10/1965  Dalziel ............................ 317/18

Primary Examiner—James D. Trammell
Attorney—McDougall, Hersh & Scott

ABSTRACT: A differential amplifier circuit is connected between the secondary of a differential transformer and an electronic switch connected in series with a relay coil adapted to operate circuit breaker contacts when the current flow through the coil is changed. The differential amplifier circuit will sense a current unbalance in the transformer during either a negative or a positive half cycle and thereby immediately provide an output "trip" signal to the electronic switch. A delay circuit is connected between the differential amplifier circuit and the electronic switch to prevent accidental operation of the electronic switch by transient signals which are picked up by any part of the control circuit.

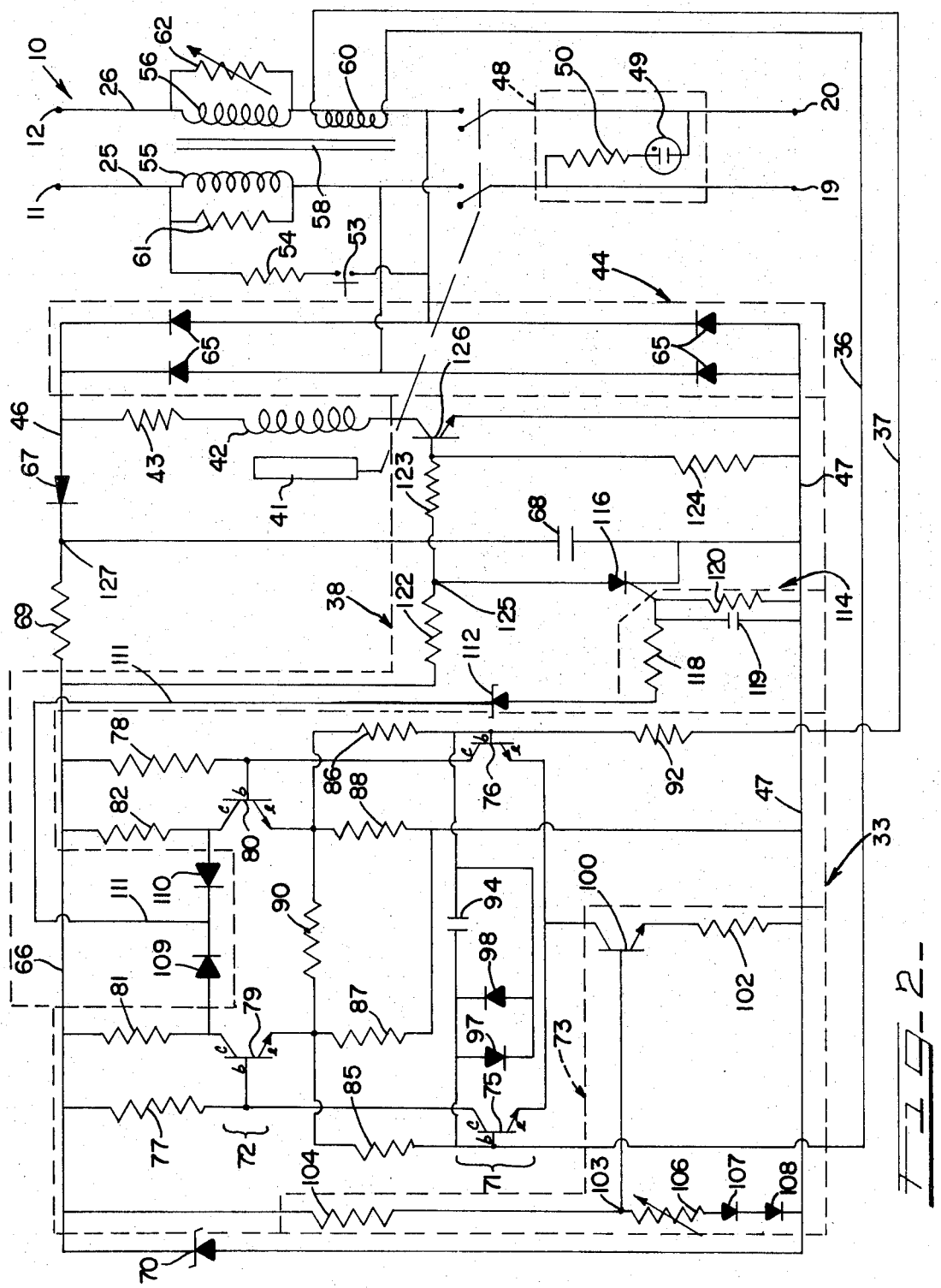

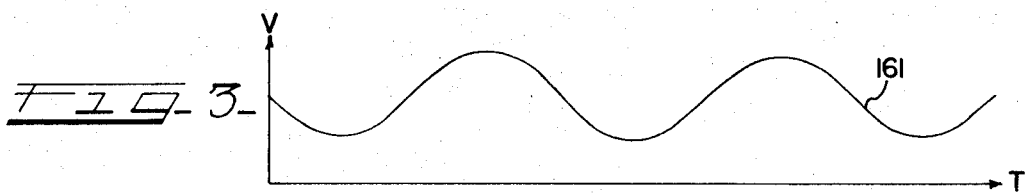
Fig-3-
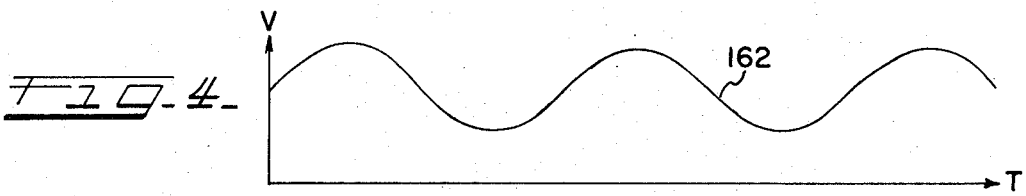
Fig-4-
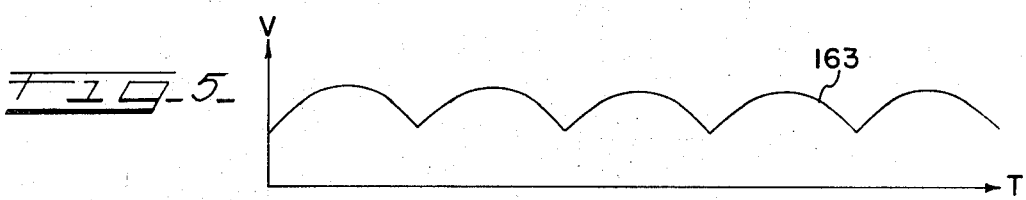
Fig-5-
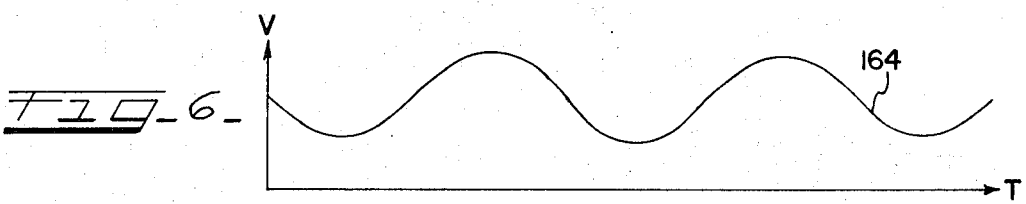
Fig-6-
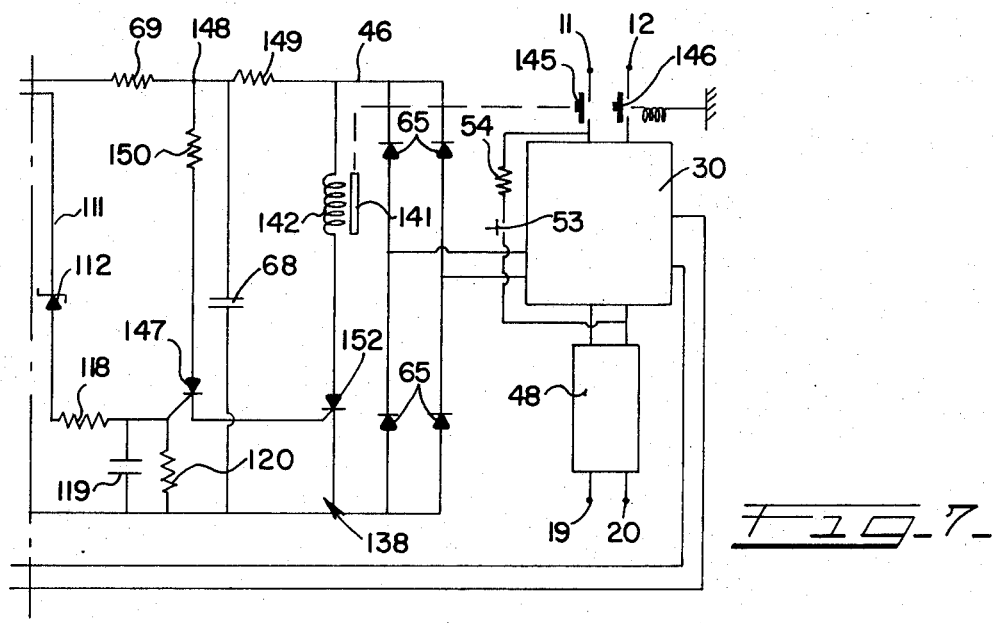
Fig-7-
INVENTORS
LOUIS J. VASSOS
ALEX F. GAWRON
BY M'Dougall, Hersh & Scott
ATT'YS.

3,633,070

GROUND FAULT CURRENT INTERRUPTER

BACKGROUND AND DESCRIPTION OF THE INVENTION

The present invention relates to a ground fault current interrupter and more particularly to a control circuit which is sensitive to low-level ground fault currents and yet highly insensitive to transient signals or other extraneous noise signals which may be imposed upon the circuit. The present invention provides improvements over prior art circuit breaker control circuits, such as the control circuits disclosed in U.S. Pat. No. 3,213,321 and British Pat. NO. 446,229.

In ground fault current interrupter circuits, it is necessary to have a very sensitive circuit which will sense or detect a small ground fault current and cause tripping or opening of the breaker contacts before the leakage current can cause injury to human life. With regard to tripping of the breaker contacts, small ground fault currents produce a very small signal (voltage) in the secondary winding of the transformer and it is necessary to amplify the same for operating an electromagnetic device to open the breaker contacts. Since the unamplified signal is very small necessitating amplification circuits which are normally sensitive to extraneous signals, many prior art amplifying circuits have not been satisfactory because of nuisance "tripping" of the breaker contacts by such extraneous signals, e.g., transient signals being "picked up" and amplified by the amplifying circuit.

To overcome this problem of accidental tripping, the present invention provides a ground fault current interrupter having a circuit breaker including a differential amplifier which amplifies a signal developed across the secondary winding of a differential transformer but which will not amplify transient signals imposed upon the electronic elements of the differential amplifier circuit. The control circuit also includes an electronic switching circuit having a signal delay circuit which is connected in series with an electromagnetic device for "tripping" the breaker contacts.

OBJECTS OF THE INVENTION

A general object of the present invention is the provision of a ground fault current interrupter circuit having high sensitivity to ground fault current signals and low sensitivity to other signals so that accidental "tripping" of the breaker contacts by extraneous and/or transient signals is prevented.

Another object of the present invention is the provision of a circuit of the type described including a differential amplifier circuit which has low DC drift of the operating DC voltages and currents with changes in temperature.

Another object of the present invention is the provision of a ground fault current interrupter circuit having a differential amplifier circuit which amplifies a fault current signal and then provides an output signal for actuating an electromagnetic device during either a negative half cycle or a positive half cycle of the fault current, thereby providing a faster response to fault current signals.

Another object of the present invention is the provision of a circuit of the type described which will "open circuit" the conductors connecting an electric power source to a load when electrical energy is absent from one of the conductors from the electric power source, thereby preventing the application of power to the load when such condition exists.

Another object of the present invention is the provision of a circuit of the type described including a differential transformer having a secondary winding connected to a signal delay circuit for delaying the application of the output signal from the differential amplifier circuit to an electronic switch connected in series with an electromagnetic device for opening the breaker contacts.

Still another object of the present invention is the provision of a portable circuit breaker unit having a control circuit for detecting low-value ground fault currents and thereupon causing opening of circuit breaker contacts, wherein the breaker contacts are automatically reset when the unit is unplugged and again plugged into a wall outlet after the breaker contacts have been opened.

Another object of the present invention is the provision of a circuit of the type described and having an amplifier for increasing the signal level from a small transformer thereby facilitating miniaturization which permits construction of a compact, portable current interrupter unit which may, in one embodiment, be plugged directly into an electrical outlet.

These and other objects and advantages of the present invention, and the manner of their attainment, will become more apparent from the following description of the preferred embodiments of the invention taken in conjunction with the accompanying drawings.

DESCRIPTION OF THE DRAWINGS

FIG. 2 is an electrical schematic diagram of the circuit elements in the control circuit shown in FIG. 1;

FIG. 3 is a graph of voltage versus time of the voltage at the collector of one transistor in the second stage of the differential amplifier circuit shown in FIG. 2 when a fault current is detected by the secondary winding of the differential transformer;

FIG. 4 is a graph of voltage versus time of the voltage at the collector of the other transistor in the second stage of the differential amplifier circuit when a fault current is detected;

FIG. 5 is a graph of the voltage versus time of the rectified output from the differential amplifier circuit when a fault current is detected;

FIG. 6 is a graph of voltage versus time of a signal developed in the secondary winding of the differential transformer when a fault current begins on one or the other cycles; and FIG. 7 is a schematic diagram of a modified switching circuit which is utilized in a permanently installed circuit breaker unit.

DESCRIPTION OF PREFERRED EMBODIMENTS

Figure 1:
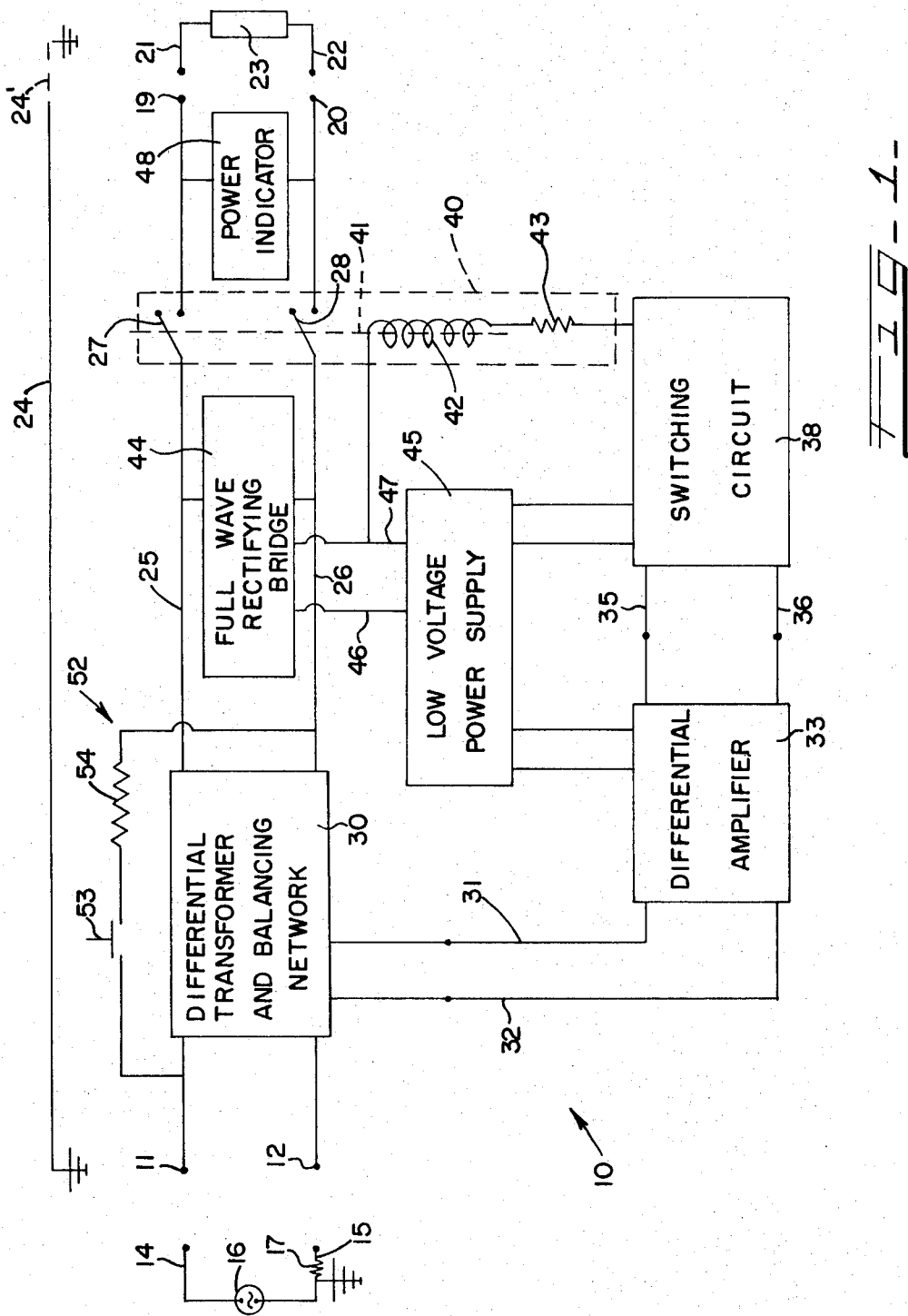
FIG. 1 is a block diagram of the ground fault current interrupter according to the present invention.

Referring now to the drawings, the circuit breaker control circuit of one embodiment of the present invention is generally indicated at 10 in FIG. 1 and includes input terminals 11 and 12 which are connected to supply lines 14 and 15 from an AC source 16. One of the supply lines 15 from the AC source 16 is grounded at a point near the source.

The circuit 10 also includes output terminals 19 and 20 which are connected to conductors 21 and 22 leading to a load 23. Typically, the load has a normally grounded conductor which is indicated generally at 24 and which grounds the casing or other nonconducting metal parts of the load 23, such as for example, when the load 23 is an electric motor. The circuit of the present invention comes into operation if this ground is broken, as indicated at 24', and if a fault condition then occurs.

The circuit 10 further includes two conductors 25 and 26. The conductor 25 is connected between terminals 11 and 19 through a breaker contact 27 and the conductor 26 is connected between terminals 12 and 20 through a breaker contact 28. A differential transformer circuit, generally indicated at 30, is connected to the two conductors 25 and 26 and is adapted to detect a difference in the current flowing in the conductors 25 and 26. In other words, when current flowing through the conductor 26 is less than the current flowing through the conductor 25, e.g., when some of the current flowing to the load through the conductor 25 is leaking from the load 23 to the ground conductor 24 and is returning to the source 16 through the ground conductor 24, or through another ground source, such as the person operating the device including the load 23, the differential transformer circuit 30 will sense this unbalance in current and will produce a signal which is applied via conductors 31 and 32 to a differential amplifier circuit indicated generally at 33. The differential amplifier circuit 33 will amplify the signal and produce an output trip signal which is applied via conductors 35 and 36 to a switching circuit indicated generally at 38. The switching circuit will respond to the output trip signal by changing the current flow through an electromagnetic device 40 to cause opening of the breaker contacts 27 and 28.

As shown, movement of the breaker contacts 27 and 28 is controlled by the electromagnetic device 40 which includes an armature, generally indicated 41, and a coil, generally indicated 42, for moving such armature. The resistance in the coil is indicated at 43.

The electric power for the differential amplifier circuit 33, the switching circuit 38 and the use coil 42 is supplied by a full wave rectifier bridge 44, connected between the conductors 25 and 26, and a low-voltage power supply 45 which receives the output from the bridge 44 via conductors 46 and 47.

A power-indicating device generally indicated at 48 is connected between the conductors 25 and 26. As shown in FIG. 2, the device 48 includes a neon bulb 49 in series with a resistor 50. The bulb 49 will indicate when the contacts 27 and 28 are closed.

A test circuit, generally indicated at 52, includes a switch 53 connected in series with a resistor 54 between the terminal 11 and the conductor 26 at the output from the differential transformer 30. Closing of the switch 53 will cause an unbalance in the currents flowing through the conductors 25 and 26 through the differential transformer circuit 30 to simulate a fault current condition. If the unit is operating properly, operation of the test switch 53 will extinguish the bulb 49.

Referring to FIG. 2, the differential transformer circuit 30 includes a first primary winding 55 which forms part of the conductor 25 and a second primary winding 56 which forms part of the conductor 26. The transformer 30 also includes a single magnetic core 58 and a single secondary winding 60 is wound on the core 58. A fixed resistor 61 is connected in parallel with the primary winding 55 and a variable resistor 62 is connected in parallel with the primary winding 56. The resistors 61 and 62 provide a balancing circuit for diverting a small amount of the load current through the resistors 61 and 62 to balance the magnetomotive forces in the transformer and compensate for any mismatch between the primary windings 55 and 56. The respective values of the resistors are such that this balanced condition can always be achieved by adjustment of the variable resistor 62 irrespective of whether the value of one of the primary windings is greater or less than the other primary winding; this feature simplifies and facilitates manufacture of units including the present invention.

The full wave rectifier bridge 44 includes four diodes 65 connected in a conventional manner as indicated for supplying voltage at an output bus 66 of the power supply 45. The low-voltage power supply 45 includes a diode 67, a capacitor 68, a resistor 69, and a Zener diode 70 which provide operating voltage between the positive bus 66 and the conductor 47, the latter serving as a negative bus. As shown, the rectified voltage from the rectifying bridge 44 is fed through the diode 67 and the peaks are stored in the capacitor 68. The resistor 69 is primarily a current-limiting resistor to limit the current that flows through the diode 67 to the bus 66. The Zener diode 70 is provided to maintain a constant voltage on the positive bus 66 for the differential amplifier circuit 33 and the switching circuit 38.

The differential amplifier circuit 33 includes a first amplifying stage 71 and a second stage 72. The circuit 33 also includes a constant current sink or generating circuit 73 which is connected in series with the first stage 71. The conductors 36 and 37 from the secondary winding 60 of the differential transformer circuit 30 are connected to the bases of two transistors 75 and 76 of the first stage 71 through resistor 92. The first stage 71 of the differential amplifier circuit 33 includes a load resistor 77 connected between the positive bus 66 and the collector of the transistor 75. In like manner, another load resistor 78 is connected between the bus 66 and the collector of the transistor 76. The second stage 72 includes a third transistor 79 and a fourth transistor 80. A load resistor 81 is connected between the bus 66 and the collector of the transistor 79 and another load resistor 82 is connected between the bus 66 and the collector of the transistor 80.

The bases of the transistors 75 and 76 of the first stage 71 each have a base resistor indicated, respectively, at 85 and 86. The base resistors 85 and 86 are connected to respective emitters of the transistors 79 and 80 so that the voltage at the emitters of the transistors 79 and 80 can forward bias the bases of the transistors 75 and 76. The voltage at the emitters is provided by the voltage drop across load resistors 87 and 88 which are connected respectively between the emitters of the transistors 79 and 80 and the negative bus 47.

The bases of the transistors 79 and 80 of the second stage 72 are connected respectively to the collectors of the transistors 75 and 76. In this way, the collector voltage on the collectors of the transistors 75 and 76 is used to forward bias the transistors 79 and 80. Also, the values of the amplifier circuit elements and of the operating voltage are such that the transistors 75 and 76 in the first stage and the transistors 79 and 80 in the second stage are normally conducting in their linear region when the circuit 10 is in operation. It will be understood that the resistors 85 and 86 are equal in value. This is also true of the resistors 81 and 82, the resistors 77 and 78, and the resistors 87 and 88.

A feedback stabilizing resistor 90 is connected between the emitters of the transistors 79 and 80 and provides a feedback voltage when one of the transistors 79 or 80 is conducting more current than the other transistor 80 or 79. A compensating resistor 92 is connected in the conductor 36 between the base of the transistor 76 and one end of the secondary winding 60. The resistor 92 compensates for any differences in gain or in the base voltage in the transistors 75, 76, 79 and 80 in the differential amplifier circuit 33. In other words, if there were differences in the gain characteristic or base voltage of the transistors 79 and 80 there would be a voltage developed across the resistor 90; the resistor 92 is provided to apply part of that voltage across the input transistors and thereby compensate for the differences in the transistors.

The function and operation of the resistors 90, 92 are as follows:

A voltage is developed across resistor 90 which is proportional to the output of the amplifier. A fraction of this voltage appears across the input bases through resistors 85 and 86 to compensate for component differences and to control the gain of the amplifier. The resistors provide both AC and DC feedback simultaneously for different purposes but in the same manner. The AC feedback is needed to provide consistent amplifier gain for variations among different transistors and for variations in transistors at different temperatures. DC feedback is necessary to achieve an equal DC operating level at the collectors of 79 and 80, by compensating for differences between transistor and resistor pairs.

For example, in the AC case, the output appears as a difference in the voltages at the collectors of transistors 79 and 80 due to a difference in current flowing through resistors 81 and 82. As a result of this difference in current flow, a portion of this voltage appears across the resistor 90 and a fraction of this is impressed on the bases of the input transistors 75 and 76 through resistors 85 and 86 in such a manner as to subtract from the input signal from the secondary winding 60.

Assume that a signal from the secondary winding results in a positive signal at the base of transistor 75 with respect to the base of 76. This results in a negative signal at the collector of 75 and at the base of 79. A positive output then appears at the collector of 79 and a negative signal at the emitter. This negative signal results in less bias current flowing through resistor 85 and a negative signal at the base of the transistor 75 which subtracts from the input signal.

Where a portion of the output is fed back and subtracts from the input, the result is negative feedback. This limits the maximum gain of the amplifier by feeding back a certain fraction of the output signal. The amount of the feedback signal depends on the resistors 81, 82, 87, 88, 85, 86, 90, 92 and the impedance of the secondary winding 60. To change the gain of the amplifier, resistor 90 might be varied; if it were zero, shorted, there would be no feedback and the gain would be high and a function of variant transistor parameters. If resistor 90 were infinite, open, the feedback would be almost 100 percent and the gain would be very slight. Since the feedback signal appears across the input bases, the impedance between these bases affects the feedback signal. In the case of AC feedback it is the impedance of the secondary winding 60 which has the most effect, while resistor 92 has only a slight influence.

As an example of the operation of the DC feedback and how it acts to balance the levels of the output, assume that the collector of transistor 79 is positive with respect to that of 80—that would mean that the emitter of transistor 79 is negative and that a negative signal appears at the base of transistor 75. This results in a positive signal at the base of transistor 79 and an increased current flow through resistor 81 which compensates for the imbalanced output by lowering the voltage at the collector of transistor 79. In the case of DC feedback the impedance between the bases is predominated by the resistor 92, while the coil resistance of the secondary winding 60 has a slight effect.

An important feature of the present invention is the provision of circuit elements in the differential amplifier circuit 33 for suppressing transient signals and for shunting high-voltage transients. For this purpose, the first stage 71 is provided with a capacitor 94 which is connected between the bases of the transistors 75 and 76 for suppressing transient signals which are picked up by the amplifier circuit 33. The capacitor 94 also serves to reduce noise in the output signal from the differential amplifier circuit 33. Also connected in parallel between the bases of the transistors 75 and 76 are two diodes 97 and 98 which provide a high-voltage shunting circuit to prevent high-voltage pulses from reaching the bases and damaging the transistors 75 and 76.

The constant current sink or generator circuit 73 includes a transistor 100 which has its collector connected to the emitters of the transistors 75 and 76 and a load resistor 102 which is connected between the emitter of the transistor 100 and the negative bus 47. It will be understood that the transistor 100 and the resistor 102 determine the sum of the current that can flow through the two transistors 75 and 76 of the first stage 71. The current flow through the transistor 100 is regulated by the voltage on the base of the transistor 100 and this voltage is determined by the voltage at a junction 103 in a potential divider circuit formed by a fixed resistor 104 and a variable resistor 106 which are connected between the positive bus 66 and the negative bus 47. It will be appreciated that by adjusting the resistance in the resistor 106, the current flowing through the transistor 100 can be varied. This, in turn, will adjust the amount of current flowing through the resistors 77 and 78 through transistors 75 and 76. The change in the currents through the resistors 77 and 78 will affect the voltage on the bases of the transistors 79 and 80 which will control the amount of current flowing through the transistors 79 and 80; this in turn will control the voltage at the emitters of the transistors 79 and 80 which is applied through the resistors 85 and 86 to the bases of the transistors 75 and 76. Thus, an adjustment of the amplification of both stages 71 and 72 can be effected merely be adjusting the resistance in the resistor 106. Stated otherwise, the resistor 106 is utilized to "trim" the differential amplifier circuit 33; this results in adjustment of the sensitivity of the circuit by varying the DC operating level.

Two diodes 107 and 108 are connected in series with the potential divider formed by the resistors 104 and 106. These diodes 107 and 108 have a forward voltage drop which varies with temperature so that the diodes 107 and 108 provide a temperature-compensating circuit for the other circuit elements, particularly the transistors 75, 76, 79, 80 and 100.

The switching circuit 38 includes the diodes 109 and 110 which rectify the voltage appearing at the collectors of the transistors 79 and 80. The difference in the collector voltages at the collectors of the transistors 79 and 80 is directly proportional to a voltage developed across the secondary winding 60 as a result of a current unbalance in the conductors 25 and 26. The rectified signal (FIG. 5) from the diodes 109 and 110 is fed via the conductor 111 to a Zener diode 112. The purpose of this Zener diode is to allow only signals above its level to enter the delay circuit to be described below. The quiescent output level of the amplifier is typically 1 volt below the level of diode 112. This Zener diode also functions to prevent small transient signals, which may be imposed on, or picked up by, the conductor 111, from operating the switching circuit 38. In one embodiment of the invention the threshold or breakdown voltage for the Zener diode 112 is 9 volts. It will be apparent that the diodes 109, 110 adapt the current interrupter to operate on both half cycles of the AC—this of course reduces the response time before opening of the breaker contacts.

The Zener diode 112 is connected to a signal delay circuit 114 which is connected between such Zener diode and the negative bus 47. The output from the signal delay circuit 114 is applied to the gate of an electronic switch 116 which forms a first stage switching device. As shown, the electronic switch 116 is typically a silicon-controlled rectifier (SCR). The signal delay circuit 114 includes a resistor 118 and a capacitor 119. The resistor 118 serves to attenuate the signal which passes through the Zener diode 112 and to delay the changing of the capacitor 119. That is to say, the capacitor 119 is charged by the signal until the voltage on the capacitor reaches a predetermined value, whereupon the SCR 116 is triggered into a conducting state. In this way, the resistor 118 and the capacitor 119 serve to delay triggering of the SCR 116.

The signal delay circuit 114 also includes a resistor 120 which serves to dissipate a charge which has collected on the capacitor 119, and in this way serves to reset the signal delay circuit 114, i.e., it reduces the charge on the capacitor 119 to zero so that this capacitor is ready for another current unbalance signal. Stated otherwise, the resistor 120 provides good repeatability in the operation of the control circuit 10. Additionally, this resistor serves as a gate-cathode compensating resistor for the SCR 116, i.e., it compensates for some differences in the gate characteristics of the SCR.

The signal delay circuit 114 not only delays the signal but prevents signals of short duration from triggering the SCR. Once the level of Zener 112 is exceeded, current begins to flow through resistor 118 to charge capacitor 119 while some of the current flows through resistor 120. During a fault condition the capacitor is charged by the peaks of the signal 1 (FIG. 5) which are above the Zener level. The voltage on the capacitor is raised during the peak of the voltage 163, while at other times it is lowered by the drain from resistor 120. At a low level of fault current this process of charging and discharging may take place over many cycles of line frequency. The waveform of the capacitor voltage prior to the firing of the SCR then looks similar to a long ascending staircase. At a high level of leakage, the capacitor may only require a few cycles of the voltage 163 to fire the SCR 116. The advantage to this type of circuit is that if a transient is impressed upon the delay circuit 114, the form of this voltage must be similar to a high-leakage signal, that is, of a high amplitude and a duration of a few cycles of voltage 163. Such a transient is very unlikely to occur. When a transient places a slight charge on the capacitor 119, the resistor 120 will discharge the capacitor to zero within a fraction of a second.

The switching circuit 38 also includes a potential divider circuit formed by resistors 122, 123 and 124, which resistors are connected between the positive bus 66 and the negative bus 47. The anode of the SCR 116 is connected to a junction 125 between resistors 122 and 123 and the negative bus 47. It will be understood that the resistor 122 is small in value and is provided for limiting the current which will flow through the SCR 116 when the SCR 116 is conducting and for suppressing transients which may accidentally turn on SCR 116 because of an excessive rate of forward-applied voltage. The resistor 123 is much larger than the resistor 122 and has a value relative to the value of the resistor 124 so that a predetermined voltage is applied to the base of a second-stage switching device 126 which, in this embodiment, is a transistor. It will be understood, that the transistor 126, which is substantially insensitive to high rate of voltage rise turn on, is normally conducting so that current is normally flowing through the coil 42. For this purpose, the transistor 126 and coil 142 are connected in series across the output from the full-wave rectifying bridge 44, i.e., between a junction 127, between the diode 67 and the resistor 69, and the negative bus 47.

When a fault current output signal exceeds the breakdown voltage of the Zener diode 112, the signal will be passed through the Zener diode 112 and through the resistor 118 to charge the capacitor 119. When the capacitor 119 is charged to a predetermined value the voltage across the capacitor 119 (which is applied to the gate of the SCR 116) will be sufficient to trigger the SCR 116 into a conductive state. The SCR 116 will then act as a shunt to shunt the potential divider circuit formed by the resistors 123 and 124. This will have the effect of lowering the forward bias voltage on the base of the transistor 126, causing the transistor 126 to "shunt off," i.e., go into a nonconducting state. When this occurs, the coil 42 will be deenergized allowing the breaker contacts 27 and 28 to open. In this respect, it will be understood that the armature 41 associated with the coil 42 is spring biased to a breaker contact open position. The magnetomotive force produced by the energized coil on the armature 41 holds the contacts 27 and 28 in the closed position. However, when the coil 42 is deenergized the biasing force of the spring (s) is sufficient to move the armature 41 and thereby open the breaker contacts 27 and 28.

It is to be noted the current flowing in the coil 42 will not be terminated instantaneously when the transistor 126 is turned off (rendered nonconducting). This is due to the fact that the energy stored in the magnetic field of the coil 42 will tend to keep the current flowing in the coil 42 for a short period of time. In one preferred embodiment of the invention the coil 42 is of the type which provides a 5 to 10 millisecond delay before the breaker contacts 27 and 28 are opened from the time the SCR 116 fires. Also, the values for the resistors 118 and 120 and the capacitor 119 are carefully chosen so that the time delay brought about by the signal delay circuit 114 in delaying the application of a trip signal to the SCR 16 for a high-fault current of 5 milliamperes, will only be 5 to 10 milliseconds. Thus, the maximum time delay before the breaker contacts 28 and 29 are opened after a high-fault current or current unbalance (typically 50 milliamperes or more) by the differential transformer circuit 30 will be not more than 20 milliseconds. For lower unbalances the delay will be increasingly longer. For example, at 5 milliamperes the delay may be 1 second.

It will be understood that the control circuit 10 shown in FIG. 2 is of the type which can be detachably connected between a source of AC and a load. In this respect, a circuit breaker device having the control circuit 10 shown in FIGS. 1 and 2 can be referred to as a portable unit.

A modified control circuit is shown in FIG. 7. Here, another form of switching circuit 138 is used in place of the switching circuit 38 and the control circuit is permanently connected to the electric power source. In other respects, the circuit elements in this circuit are essentially the same as the circuit elements shown in FIG. 2 and for this reason, where possible, like reference numerals are used in FIG. 7 as are used in FIG. 2.

An armature 141 is associated with a coil 142 for opening spring-biased circuit breaker contacts 145 and 146. The armature 141 is moved by a change in the current flow through the coil 142 to "trip" the spring-biased breaker contacts 145 and 146 to an open position. The coil 142 is normally deenergized. In this modified switching circuit 138, the capacitor 119 is connected to the gate of a first stage, highly sensitive SCR 147. The anode of the SCR 147 is connected between a junction 148 between the current-limiting resistor 69 of the power supply and a current-limiting resistor 149 in the conductor 46 from the full-wave rectifier 44. The resistor 149 serves as a current-limiting resistor and is used in place of the diode 67 used in the FIG. 2 circuit. A load resistor 150 is connected between the junction 148 and the anode of the SCR 147 and serves to limit the current flowing through the SCR 147; this resistor also suppresses the forward rate of applied voltage. The cathode of the SCR 147 is connected to the gate of a second stage SCR 152 having relatively low sensitivity. The SCR 152 is connected in series with the coil 142 between the conductor 46 and the negative bus 47.

It will be understood that the SCR 147 is a highly sensitive, low-triggering voltage SCR whereas the SCR 152 is relatively insensitive power SCR. By using the sensitive SCR 147 and the relatively insensitive SCR 152, very good control of the energization of the relay coil 142 is obtained without the adverse effects of the rate of forward-applied voltage. Current will flow through the resistor 150 and the SCR 147 to the gate of the SCR 152 to turn on the SCR 152 to allow current to flow through the coil 142. This will cause movement of the armature 141 associated with the coil 142 to "trip" the spring-biased breaker contacts 145 and 146 to the open circuit position.

Referring now to the operation of the control circuit 10 shown in FIG. 2, under conditions of normal current flow no net flux is produced in the core 58 of the transformer circuit 30 since the magnetomotive forces produced in the windings 55 and 56 cancel each other. However, when a ground fault occurs in the load, the current flowing through one of the primary windings 55 is greater than the current flowing through the other primary winding 56, such that the magnetomotive forces do not cancel each other. This results in a net flux in the core 58 which induces a signal (voltage) in the secondary winding 60 of the transformer 30. If the ground fault current is of a sufficient level, i.e., over 5 milliamperes, the signal appearing across the secondary winding 60 will ultimately result in actuation of the breaker contacts 27 and 28 to cut off power to the load.

More specifically, the signal developed across the secondary winding 60 will be applied across the bases of the transistors 75 and 76 in the first stage 71 of the differential amplifier circuit 33. Assuming that this signal is positive at the base of the transistor 75, it will be negative at the base of the transistor 76. An increase in the potential at the base of the transistor 75 and a corresponding decrease of the voltage at the base of the transistor 76 will cause an increase in the current flowing through the transistor 75 and a decrease in the current flowing through the transistor 76. The change in the flow of current through the transistors 75 and 76 will cause a change in the potential drop across the resistors 77 and 78, such that the voltages applied to the bases of the transistors 79 and 80 will be changed. The voltage at the collector of the transistor 79 will be increased as a result of the decrease in the voltage on the base of the transistor 79. On the other hand, the voltage at the collector of the transistor 80 will be decreased as a result of the increase in the voltage applied to the base of the transistor 80. The output from the second stage 72 of the differential amplifier 33 is the sum of the positive polarities of the output signals appearing at the collectors of the transistors 79 and 80, respectively. This combined signal is fed by the conductor 111 to the switching circuit to trigger SCR 116 to turn off transistor 126 to cause opening of the breaker contacts 25 and 26. In the modified circuit shown in FIG. 7, the SCR 147 is triggered on to trigger on the SCR 152 to cause opening of the breaker contacts 145 and 146.

It is to be noted that the use of a direct coupled differential amplifier circuit has advantages over a direct coupled amplifier in that the differential amplifier circuit is relatively immune to erroneous signals and has a low DC drift with temperature. In other words, the differential amplifier circuit 33 does not amplify common mode signals which are applied to both input terminals, e.g., the bases of the transistors 75 and 76, in the same polarity with respect to the supply terminals of the amplifier circuit, e.g., the supply voltage at the positive bus 66 which is applied through resistors 77 and 78 to the collectors of the transistors 75 and 76. This characteristic of the differential amplifier circuit renders the control circuit 10 very resistant to nuisance tripping, by not permitting the circuit 10 to respond to common mode noise signals which may come through the power supply circuit 45 or from the transformer 30.

Another advantage of the differential amplifier circuit is the fact that the control circuit 10 responds to fault currents of either polarity. In other words, regardless of when the fault occurs in time, a signal will begin to appear on the capacitor 119 in the time delay circuit 117.

Thus, as shown by the voltage versus time curves 161–164 in FIGS. 3–6, when a fault signal develops (e.g., on the negative half cycle as shown by the curve 164 in FIG. 6), the collector voltages on the transistors 78 and 80 will have the waveform shown by the curves 161 and 162 in FIGS. 3 and 4. The output signal to the switching circuit 38 will have a waveform as shown by the curve 163 in FIG. 5.

By having a trip output signal developed during either the positive half cycle or the negative half cycle of the AC flowing through the conductors 25 and 26, a faster response of the differential amplifier circuit 33 is obtained. The faster response obtained makes it possible to decrease the speed of response of the switching circuit 38 without unduly slowing the overall reaction time of the control circuit 10. In this way, fault current signals of short duration, which may have been caused by voltage or current transients will have a lesser likelihood of causing a nuisance "trip out" of the breaker contacts 27 and 28, or the contacts 145 and 146 in the modified embodiment shown in FIG. 7.

Thus it will be seen, that the control circuit 10 provides a very reliable circuit breaker control circuit which is very resistant or immune to erroneous noise signals or transient signals, due to the provision of the diodes 109, 110, which could otherwise cause accidental or nuisance tripping of the breaker contacts 27 and 28 (or the breaker contacts 145 and 146). Moreover, the control circuit 10 can be contained in a small package of not more than a few cubic inches for ready connection between a wall outlet and a plug from an electrical appliance or tool. On the other hand, the interrupter circuit 10 can be permanently installed in a power source connection as shown in FIG. 7.

In both embodiments of the invention disclosed herein, the ground fault current interrupter will operate to open the circuit breaker contacts before the ground fault current reaches the level or degree as prescribed by established testing institutions, e.g., Underwriters Laboratories, for the protection of human life. The current interrupter circuit of the present invention will operate considerably before the ground fault current reaches a level sufficient to cause serious injury or death through uncontrolled reaction or ventricular fibrillation.

We claim:

1. In a ground fault current interrupter including a control circuit which is adapted to detect a current unbalance between the current flowing in a first conductor connected between an alternating current source and a load and the current flowing in a second conductor connected between said source and said load and then to actuate open circuiting means connecting said conductors to said source, the improvement comprising, said control circuit including a differential transformer having a single magnetic core, two primary windings each of which is connected in series with one of said conductors, and a secondary winding, said primary windings being arranged so that under normal current conditions the total magnetomotive force produced in said magnetic core is balanced such that the net magnetic flux in said core is zero and under a current unbalance condition a net flux results which produces a voltage signal in said secondary winding of said differential transformer, amplifier circuit means connected to said secondary winding for developing a differential signal from the latter and for amplifying such signal, which amplifier circuit means includes means immunizing the latter from erroneous input noise signals and input transient signals, and means connected between said open circuiting means and said amplifier circuit means for actuating said open circuiting means upon receiving an amplified signal from said amplifier circuit means when said current unbalance is at or above a predetermined value for a predetermined time period.

2. The improvement according to claim 1 wherein a resistor is connected in parallel with each of said primary windings and one of said resistors is a variable resistor whereby the magnetomotive forces developed in each primary winding can be made equal for a balanced current.

3. The improvement according to claim 1 wherein said open circuiting means includes an armature associated with breaker contacts and adapted to be moved to cause opening of said contacts, a coil associated with said armature and adapted to cause movement of said armature upon a change in current flow through said coil, and an electronic switch connected in series with said coil to a source of direct current, said electronic switch also being connected to said amplifier circuit means so that an output signal from the latter causes a change in the current flow through said electronic switch to change the current flow through said coil and thereby cause opening of said breaker contacts.

4. The improvement according to claim 1 wherein a signal delay circuit is connected between said amplifier circuit means and said open circuiting means to delay the application of the output signal from the amplifier circuit means to the open circuiting means and thereby provide protection against accidental actuation of said open circuiting means by transient signals.

5. The improvement according to claim 3 wherein said open circuiting means includes said first-mentioned electronic switch and another electronic switch, said another electronic switch being connected between said amplifier circuit means and said first-mentioned electronic switch, said second electronic switch having high sensitivity to signals from said amplifier circuit means and said first-mentioned electronic switch connected in series with said coil being substantially insensitive to high rate of voltage rise turn on.

6. The improvement according to claim 1 including a Zener diode connected between said amplifier circuit means and said open circuiting means and adapted to pass output signals from said amplifier circuit means which are above a certain value.

7. The improvement according to claim 1 further defined by, said control circuit including other means adapting such circuit to be responsive to a current unbalance condition on both half cycles of the AC source.

8. The improvement according to claim 7 wherein said other means include at least a pair of unidirectional current-blocking elements.

9. The improvement according to claim 1 further defined by, a pair of resistors connected in parallel with said primary windings, respectively, one of said resistors being a variable resistor, the respective values of said resistors being such that the other of said resistors causes an unbalance condition in said primary windings within the range of adjustment of said one resistor thereby permitting the latter to restore said primary windings to a balanced condition.

10. In a ground fault current interrupter adapted to be interposed in a pair of current supply lines between a current source and a load, the combination which comprises, means operable to open circuit said supply lines, means for detecting current flow unbalance between said supply lines and producing a voltage signal representative thereof, a differential amplifier circuit for amplifying said voltage signal, said differential amplifier circuit including means rendering the same insensitive to erroneous input noise signals and input transient signals, and means responsive to said amplified voltage signal attaining or exceeding a predetermined value for a predetermined period of time for rendering said open circuiting means operative.

11. In a ground fault current interrupter including a control circuit which is adapted to detect a current unbalance between the current flowing in a first conductor connected between an alternating current source and a load and the current flowing in a second conductor connected between said source and said load and then to actuate said circuiting means connecting said conductors to said source, the improvement comprising means associated with said conductors and responsive to said current unbalance for developing a voltage signal representative of said current unbalance, amplifier circuitry connected to said voltage signal developing means for amplifying said voltage signal, means for immunizing said amplifier circuitry from erroneous input noise signals and input transient signals, and means responsive to said amplified voltage signal for actuating said open circuiting means when said current unbalance has attained or exceeded a predetermined value for a predetermined time period.

* * * * *

REEXAMINATION CERTIFICATE (915th)
United States Patent [19]
Vassos et al.

[11] B1 3,633,070
[45] Certificate Issued Aug. 30, 1988

[54] GROUND FAULT CURRENT INTERRUPTER

[75] Inventors: Louis J. Vassos; Alex F. Gawron, both of Chicago, Ill.

[73] Assignee: Leviton Manufacturing Co., Little Neck, N.Y.

Reexamination Request:
No. 90/001,274, Jul. 2, 1987

Reexamination Certificate for:
Patent No.: 3,633,070
Issued: Jan. 4, 1972
Appl. No.: 884,888
Filed: Dec. 15, 1969

[51] Int. Cl.⁴ .................................................. H02H 3/16
[52] U.S. Cl. ........................................ 361/45; 361/49; 361/94; 361/110; 361/46
[58] Field of Search ........................................ 361/44–46, 361/49, 86, 89, 55, 94, 98, 100–102, 110, 111; 340/650

[56] References Cited
U.S. PATENT DOCUMENTS

| | | | |
|---|---|---|---|
| 3,213,321 | 10/1965 | Dalziel | 361/46 |
| 3,435,292 | 3/1969 | Stephen et al. | 361/45 |
| 3,475,653 | 10/1969 | Odenberg et al. | 361/55 |
| 3,555,359 | 1/1971 | Morris | 361/49 |

FOREIGN PATENT DOCUMENTS 2036134 2/1971 Fed. Rep. of Germany.

Primary Examiner—A. D. Pellinen

[57] ABSTRACT

A differential amplifier circuit is connected between the secondary of a differential transformer and an electronic switch connected in series with a relay coil adapted to operate circuit breaker contacts when the current flow through the coil is changed. The differential amplifier circuit will sense a current unbalance in the transformer during either a negative or a positive half cycle and thereby immediately provide an output "trip" signal to the electronic switch. A delay circuit is connected between the differential amplifier circuit and the electronic switch to prevent accidental operation of the electronic switch by transient signals which are picked up by any part of the control circuit.

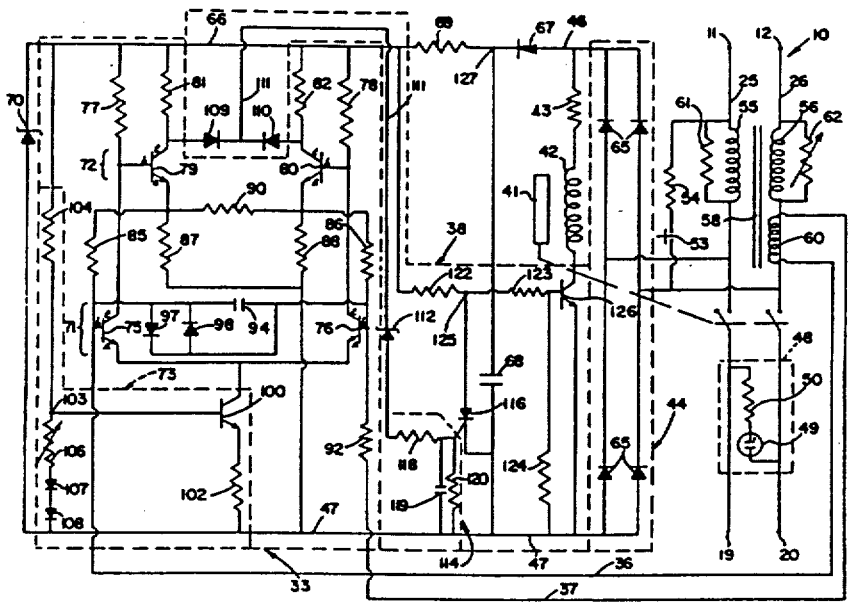

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-7 and 9-11 are cancelled.

Claim 8 is determined to be patentable as amended.

8. [The improvement according to claim 7 wherein] *In a ground fault current interrupter including a control circuit which is adapted to detect a current imbalance between the current flowing in a first conductor connected between an alternating current source and a load and the current flowing in a second conductor connected between said source and said load and then to actuate open circuiting means connecting said conductors to said source, the improvement comprising, said control circuit including a differential transformer having a single magnetic core, two primary windings each of which is connected in series with one of said conductors, and a secondary winding, said primary windings being arranged so that under normal current conditions the total magnetomotive force produced in said magnetic core is balanced such that the net magnetic flux in said core is zero and under a current imbalance condition a net flux results which produces a voltage signal in said secondary winding of said differential transformer, amplifier circuit means connected to said secondary winding for developing a differential signal from the latter and for amplifying such signal, which amplifier circuit means includes means immunizing the latter from erroneous input noise signals and input transient signals, and means connected between said open circuiting means and said amplifier circuit means for actuating said open circuiting means upon receiving an amplified signal from said amplifier circuit means when said current unbalance is at or above a predetermined value for a predetermined time period, said interrupter further including other means adapting such control circuit to be responsive to a current unbalance condition on both half cycles of the AC source,* said other means [include] *including* at least a pair of unidirectional current blocking elements.

* * * * *